(12) United States Patent
Shibata

(10) Patent No.: US 7,516,461 B2
(45) Date of Patent: Apr. 7, 2009

(54) DISK DEVICE

(75) Inventor: Masaharu Shibata, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 448 days.

(21) Appl. No.: 11/331,046

(22) Filed: Jan. 13, 2006

(65) Prior Publication Data

US 2006/0161930 A1    Jul. 20, 2006

(30) Foreign Application Priority Data

Jan. 14, 2005    (JP) .............................. 2005-007492

(51) Int. Cl.
 *G11B 17/04* (2006.01)
(52) U.S. Cl. ...................... 720/604; 720/601
(58) Field of Classification Search .......... 720/601–616
 See application file for complete search history.

(56) References Cited

U.S. PATENT DOCUMENTS

2005/0144625 A1* 6/2005 Chiu ......................... 720/601

FOREIGN PATENT DOCUMENTS

| EP | 0 561 350 A2 | | 9/1993 |
|---|---|---|---|
| JP | 60050748 A | * | 3/1985 |
| JP | 05-047094 | | 2/1993 |
| JP | 11-134758 | | 5/1999 |
| JP | 2001-021155 A | | 1/2001 |
| JP | 2001-222847 A | | 8/2001 |
| JP | 2002184071 A | * | 6/2002 |
| JP | 2002-352499 A | | 12/2002 |
| JP | 2002352499 A | * | 12/2002 |
| JP | 2003-022599 | | 1/2003 |
| JP | 2004-145912 A | | 5/2004 |

* cited by examiner

*Primary Examiner*—William J Klimowicz
(74) *Attorney, Agent, or Firm*—Global IP Counselors, LLP

(57) ABSTRACT

A disk device includes a disk tray movable between a closed position and an open position; and an upper case positioned above the disk loading region of the disk tray when the disk tray is at the closed position. The disk tray includes a base, a disk loading region which receives the disk, and an upward facing projection formed on a closed position side of the disk loading region. The upper case includes an upper ceiling portion, a downward facing projection that projects downward from the upper ceiling portion, and an inclined surface formed between the upper ceiling portion and the downward facing projection so as to be inclined downward in a direction toward the closed position. The upward facing projection is positioned on the closed position side relative to the downward facing projection when the disk tray is at the closed position.

5 Claims, 4 Drawing Sheets

PRIOR ART

DISK DEVICE

BACKGROUND OF THE INVENTION

1. Field of the Invention

The present invention relates to a disk device. More particularly, the present invention relates to a disk device that is capable of smoothly ejecting a disk that has been loaded therein.

2. Background Information

FIG. 6 shows an example of a known disk device. FIG. 6 shows a disk tray 101 at the closed position, turntable 102, and a horizontal bar 104 supporting a clamp 103. In this disk device, the disk tray 101 moves in an arrow F direction from the closed position shown in the drawing and arrives at an open position that is not shown in the drawing. The disk tray 101 can also move in a direction opposite the arrow F direction from the open position and arrives at the closed position shown in the drawing.

At the open position, a disk D is loaded in a disk loading region Z1 formed as a concave receptacle on the disk tray 101. The disk loading region Z1 corresponding to a disk D of a large size, and a disk loading region Z2 corresponding to a disk (not shown in the drawing) of a small size and formed concentrically at the center position of the disk loading region Z1 are formed in the disk tray 101 as shown FIG. 6. These two disk loading regions Z1 and Z2 are used in accordance with the size of the disk.

The turntable 102 is positioned below the disk D loaded in the disk tray 101, which is moved from the open position to the closed position, such that when the turntable 102 is raised, the disk D loaded in the disk loading region Z1 (or disk loading region Z2) of the disk tray 101 is received by the turntable 102 and lifted from the disk tray 101. Thus, when the turntable 102 lifts the disk D, a clamp 103 disposed above the disk D overlaps the top surface of the disk D and operates its suction function such that the disk D is pressed against the turntable 102. The disk D is chucked by the turntable 102 and clamp 103 through this series of operations. Thereafter, when a recording or playing mode is selected, the turntable 102 rotates together with the disk D, and writing or reading is performed on the recording surface of the disk D by an optical pickup not shown in the drawing.

In this disk device, the disk tray 101 is assembled to a frame body not shown in the drawing so as to be movable between the closed position and the open position. The horizontal bar 104, which is formed of resin, is formed unitarily with the frame body as a one-piece member. Hereinafter, the direction of the arrow F is referred to as the frontward direction, while the direction opposite the arrow F is referred to as the rearward direction.

A downward facing projection 141 is formed at a rear end portion of the horizontal bar 4, as shown in FIG. 6. When the disk D loaded in the disk loading region Z1 (or disk loading region Z2) of the disk tray 1 disengages from the disk loading region Z1 and shifts rearward from the region Z1 (or Z2) for any reason, this downward facing projection 141 contacts the peripheral edge of the disk D as indicated by the dashed lines in FIG. 6, such that the disk D is prevented from going behind the horizontal bar 104.

In the disk device described with reference to FIG. 6, when the peripheral edge of a disengaged disk D shifts rearward from the disk tray 101 is stopped by the downward facing projection 141 indicated by the dashed lines, and at the same time the disk ejection mode is selected such that the disk tray 101 is moved in the arrow F direction from the closed position shown in the drawing to an open position, only the disk tray 101 may move to the open position. The disk D may remain within the body structure due to the inclination of the disk D. As a result, the disk D cannot be ejected from the disk tray 101.

As shown in FIGS. 7 and 8, it has also been conceived to add upward facing portions 212 to the disk tray 201, such that when the disk tray 201 moves from the closed position to the open position, the upward facing portions 212 stop the peripheral edge of the flying disk D that has disengaged from the disk loading region Z1 (or disk loading region Z2) of the disk tray 201. In this manner, the disk D will be ejected from the disk tray 201.

Although there are some improvements in remedying the problem of the disk D remaining within the body structure from the addition of the upward facing portions 212 on the disk tray 201, the problems discussed below are now discovered.

When the peripheral edge of the disk D is stopped by the downward facing horizontal bar 241 when the disengaged disk D moves rearward from the disk tray 201 as shown in FIG. 8, and at the same time the disk ejection mode is selected, the disk tray 201 is caused to move from the closed position shown in the drawing to the open position. At this time, the upward facing portions 212 fail to engage the peripheral edge of the disk D depending on the inclination of the disk D. Instead, the upward facing portions 212 slide in the F direction beneath the disk D as indicated by the dashed lines, with the result that the disk D cannot be ejected. In this case, not only is the disk D prevented from being ejected by due to the upward facing portions 212 locking the underside of the disk D, there is concern that the disk tray 201 may be jammed and may no longer open smoothly.

In view of the above, it will be apparent to those skilled in the art from this disclosure that there exists a need for an improved disk device that overcomes the problems of the known art. This invention addresses this need in the art as well as other needs, which will become apparent to those skilled in the art from this disclosure.

SUMMARY OF THE INVENTION

An object of the present invention is to provide a disk device from which a disk can be retrieved smoothly.

In the disk device of the first aspect of the present invention, a disk is adapted to be loaded. The disk device includes a body structure; a disk tray supported by the body structure so as to be movable between a closed position and an open position, the disk tray including a base, a disk loading region which is adapted to receive the disk and is formed on the base, and an upward facing projection formed on the base on a closed position side of the disk loading region; and an upper case supported by the body structure and positioned above the disk loading region of the disk tray when the disk tray is at the closed position, the upper case including an upper ceiling portion, a downward facing projection formed on the upper ceiling portion so as to project downward, and an inclined surface formed between the upper ceiling portion and the downward facing projection so as to be inclined downward in a direction toward the closed position, the upward facing projection being positioned on the closed position side relative to the downward facing projection when the disk tray is at the closed position.

According to this configuration, the peripheral edge of a disk that has disengaged from the disk loading region of the disk tray is stopped by the bottom facing projection formed on the upper case, thus preventing the disk from shifting behind the upper case. The peripheral edge of the disk slides along the inclined surface provided on the downward facing projection, and is positioned opposite the upward facing projection formed on the disk tray side. Therefore, even when the disk disengages the disk loading region and becomes stuck at the downward facing projection, the upward facing projection engages at the peripheral edge of the disk and ejects the disk as the disk tray moves from the closed position to the open position.

In the present invention, it is desirable that the upward facing projection be formed on the base so as not to reach the downward facing projection when the disk tray moves from the closed position to the open position. In this way, the smoothness of the disk tray movement is not compromised by the interference of the upward facing projection with the downward facing projection.

In the present invention, it is desirable that the downward facing projection project downward from a bottom end portion of the inclined surface, a distance by which the downward facing projection extends downward beyond the bottom end portion of the inclined surface be designed to be smaller than a thickness of a peripheral edge of the disk, and a vertical distance between a bottom end of the downward facing projection and an upper end of the upward facing projection is smaller than a width of the peripheral edge of the disk that is exposed beneath the bottom end of the downward facing projection when the downward facing projection engages the disk. In this way, it is possible to prevent the upward facing projection from sliding beneath the disk or becoming stuck at the bottom side of the disk.

In the present invention, it is desirable that the disk device further have a turntable arranged in the body structure below the disk loading region of the disk tray when the disk tray is at the closed position, the turntable being adapted to chuck the disk; and a clamp disposed above the turntable, the clamp being adapted to chuck the disk together with the turntable, the clamp being supported by the upper ceiling portion of the upper case.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
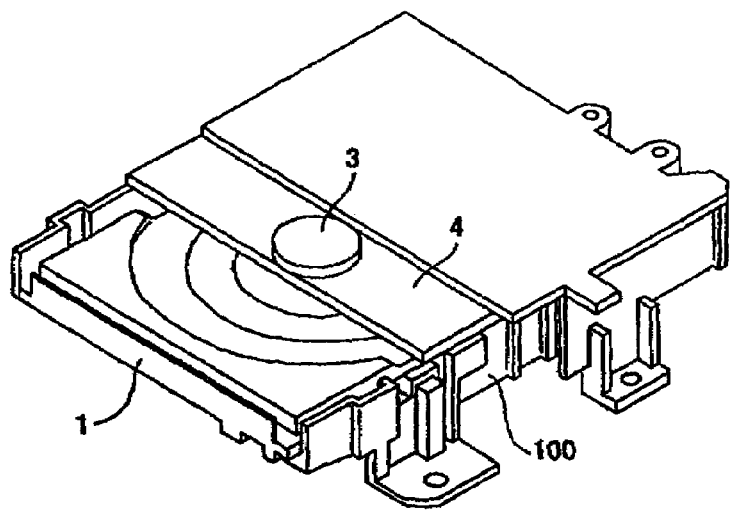
FIG. 1 is an external perspective view of the disk device in accordance with an embodiment of the invention.
Figure 2:
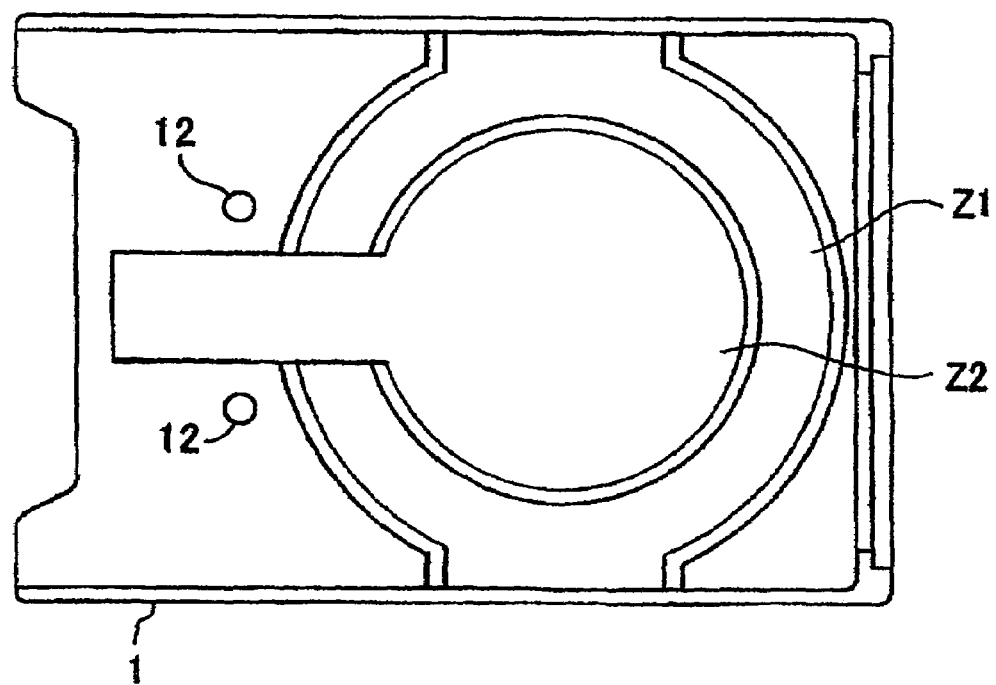
FIG. 2 is a plan view of the disk device in accordance with the embodiment of the invention.
Figure 3:
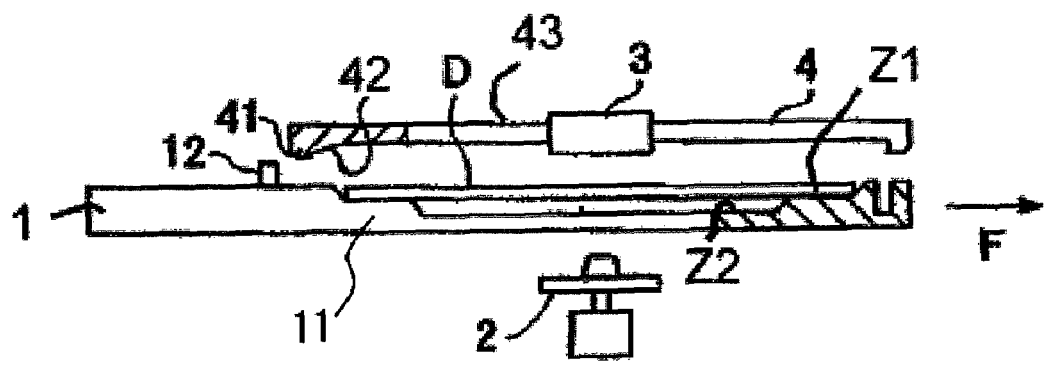
FIG. 3 is a schematic side view of the disk device in accordance with the embodiment of the invention.
Figure 4:
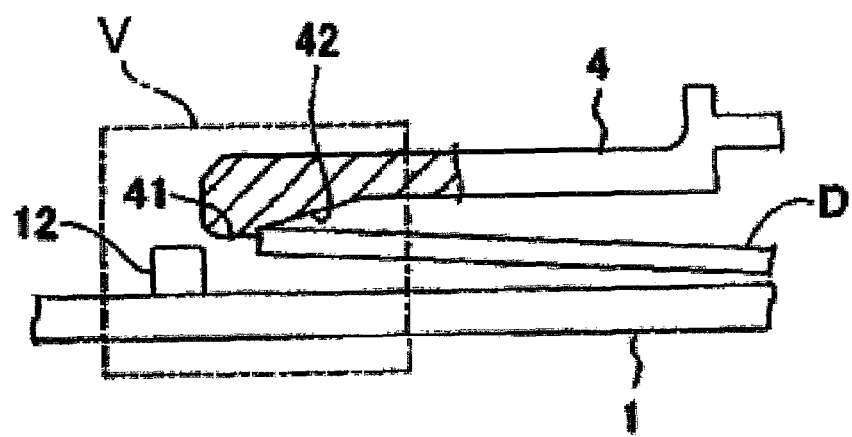
FIG. 4 is a partial side view of the disk device in accordance with the embodiment of the invention.

FIG. 1 is an external perspective view briefly showing the disk device; FIG. 2 is a plan view of the disk tray 1; FIG. 3 is a schematic section view of the disk device of the first embodiment; FIG. 4 is a partial exploded section view of the main parts of the first embodiment; and FIG. 5 is an enlargement of part indicated as V in FIG. 3.

As shown in FIGS. 1-3, the disk device includes a body structure 100, a disk tray 1, a turntable 2, a clamp 3, and a horizontal bar 4 (an example of the upper case). The disk tray 1 is assembled in the body structure 100 that is formed of a resin body. The disk tray 1 is supported by the body structure 100 so as to be movable by a motor between a closed position within the body structure 100 and an open position outside the body structure 100. As shown in FIG. 2, the disk tray 1 has a disk loading region Z1 and a disk loading region Z2 that are concentrically formed and which receives the disk D. The horizontal bar 4, which is formed of resin, is formed unitarily with the body structure 100 as a one-piece structure, such that the horizontal bar 4 is positioned above the disk tray 1 when the disk tray 1 is at the closed position. The clamp 3 is supported by the horizontal bar 4 above the turntable 2. The turntable 2 is arranged in the body structure 100 to chuck the disk by working together with the clamp 3.

The disk tray 1, the turntable 2, and the clamp 3 are operatively connected to a control unit that is not shown in Figures. The control unit selectively controls the operation of these components according to signals inputted by the user and operation programs stored therein. More specifically, the control unit preferably includes a microcomputer with a control program that controls the opening and closing operations of the disk tray 1 and the chucking operation of the turntable 2 and the clamp 3. Since these operations are well known in the art, details thereof will not be discussed or illustrated in detail herein.

Figure 5:
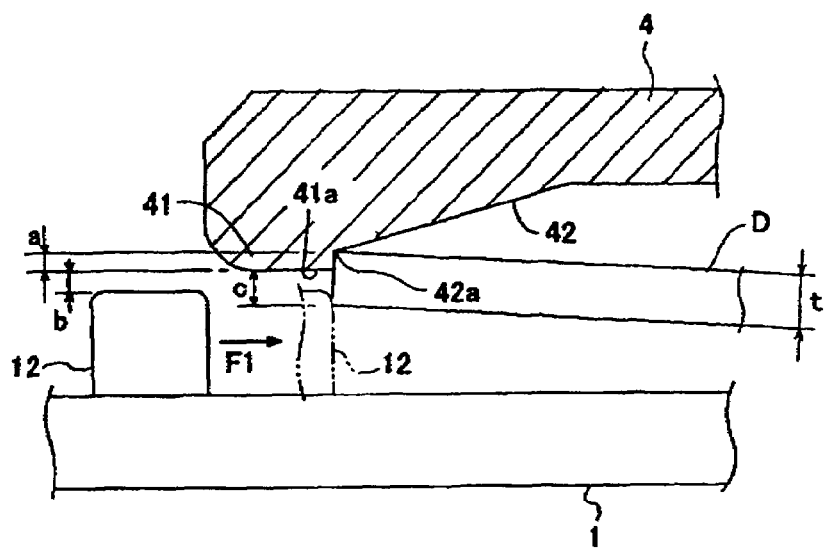
FIG. 5 is an enlarged view of the part V shown in FIG. 4.
Figure 6:
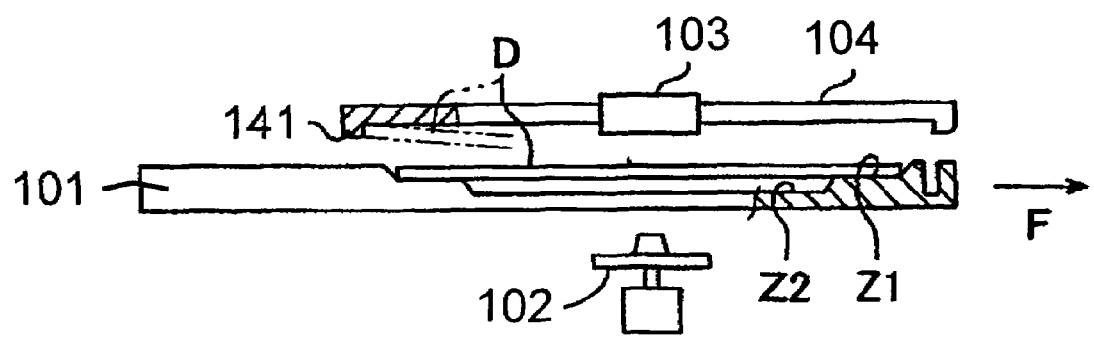
FIG. 6 illustrates an example of known disk device.
Figure 7:
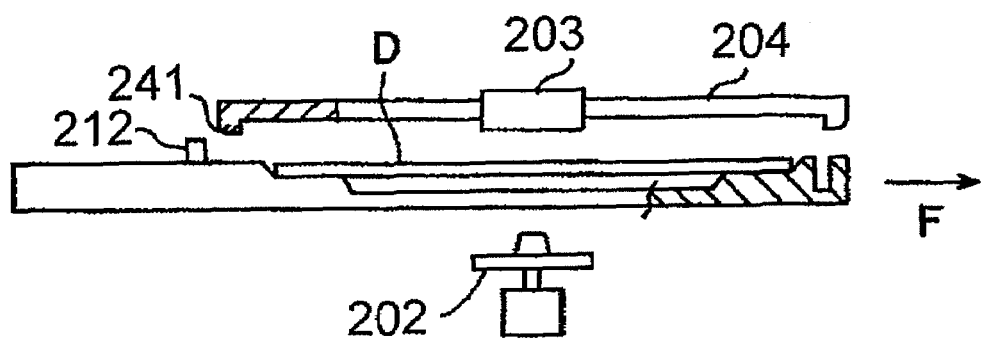
FIG. 7 illustrates another example of known disk device.
Figure 8:
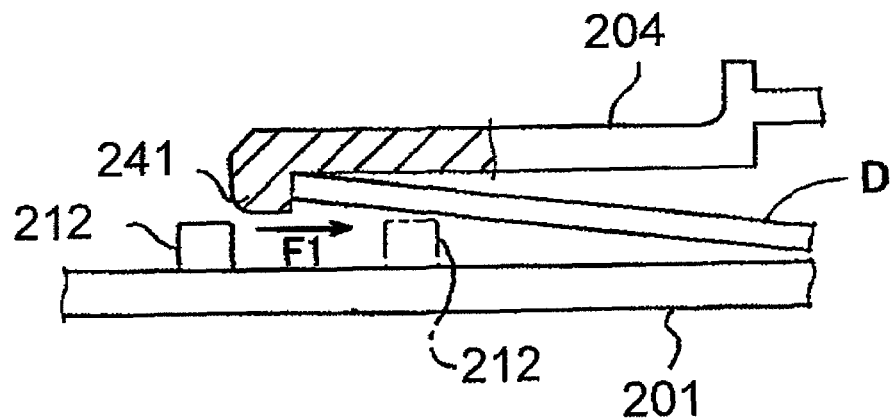
FIG. 8 illustrates the example of the known disk device of FIG. 7.

As shown in FIGS. 4 and 5, the horizontal bar 4 has a clamp support portion 43 (an example of the upper ceiling portion), and a downward facing projection 41 that is unitarily formed on the clamp support portion 43, such that the downward facing projection 41 stops the peripheral edge of a disk D that has disengaged from and has become misaligned relative to a disk loading region Z1 (or a disk loading region Z2) of the disk tray 1 at the closed position, so as to prevent the disk D from sliding toward the rear of the horizontal bar 4.

As shown in FIGS. 2-3, the disk tray 1 has a base 11, and a disk loading region Z1 for a large sized disk and a disk loading region Z2 for a disk (not shown in the drawing) of a small size disk that are concentrically formed at a center position in a concave receptacle shape on the base 11 of the disk tray 1. Upward facing projections 12 which are formed of resin are unitarily formed on the rear side (closed position side) of the disk loading regions Z1 and Z2. Since the upward facing projections 12 are formed short enough, they do not reach the downward facing projection 41 when the disk tray 1 is moved from the closed position to the open position.

As shown in FIGS. 4 and 5, the horizontal bar 4 of the disk drive of the present embodiment is provided with a disk depressing guide surface 42 (an example of the inclined surface), which is inclined rearward and downward, between the downward facing projection 41 and the clamp support portion 43 of the horizontal bar 4. The disk depressing guide surface 42 pushes the peripheral edge of the disk D that has disengaged from the disk loading position Z1 (or disk loading position Z2) and shifted rearward, such that the disk D slides rearward along the disk depressing guide surface 42 and project from the bottom end 41a of the downward facing projection 41. At that point, the disk D is positioned opposite the upward facing projections 12, which are formed on the disk tray 1 on the rear side (closed position side) relative to the downward facing projection 41, as shown in FIG. 5.

In FIG. 5, the downward facing projection 41 is formed so as to project from the rear bottom end 42a of the disk depressing guide surface 42. The distance a by which the downward facing projection 41 extends downward beyond the rear bottom end 42a of the disk depressing guide surface 42 is shorter than the thickness t of the peripheral edge of the disk D, and the vertical distance b between the bottom end 41a of the downward facing projection 41 and the upper surfaces of the upward facing projections 12 are shorter than the distance c by which the peripheral edge of the disk D is exposed beneath the bottom end 41a of the downward facing projection 41 when the downward facing projection 41 engages the disk D.

A disk device of the above described configuration, even when the disk D becomes disengaged from the disk loading region Z1 (or disk loading position Z2) of the disk tray 1 that is at the closed position, the peripheral edge of the disk D is stopped by the downward facing projection 41 of the horizontal bar 4. Thus, the disk D is prevented from sliding behind the horizontal bar 4, as shown in FIGS. 4 and 5. Furthermore, since the peripheral edge of the disk D is stopped by the upward facing projections 12 formed on the disk tray 1, even if the disk D slides past the downward facing projection 41 by chance, the disk D can still be prevented from sliding behind the horizontal bar 4. Accordingly, the situation in which the disk D cannot be removed unless the disk device is broken apart to remove the disk tray 1 from the body structure 100 is less likely to occur.

As shown in FIGS. 4 and 5, the state in which the peripheral edge of the disk D is stopped by the downward facing projection 41 of the horizontal bar 4 occurs when the peripheral edge of the disk D slides backward along the disk depressing guide surface 42. Therefore, a part of the peripheral edge of the disk D stopped by the downward facing projection 41 extends below the bottom end 41a of the downward facing projection 41 by the exposed width dimension c, and is positioned opposite the upward facing projections 12 in the horizontal direction (direction of the movement of the disk tray 1).

Accordingly, when the disk tray 1 moves from the closed position to the open position, the upward facing projections 12 stop at the peripheral edge surface of the disk D as indicated by the dashed line 12 in FIG. 5, and the disk D is ejected from the body structure 100 by the disk tray 1. When the disk tray 1 moves from the closed position to the open position, the upward facing projections 12 pass under the downward facing projection 41 without interfering with the downward facing projection 41. Accordingly, the situation in which the upward facing projection 12 interferes with the downward facing projection 41 causing loss of smooth movement of the disk tray 1 can be prevented.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2005-007492. The entire disclosure of Japanese Patent Application No. 2005-007492 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A disk device in which a disk is adapted to be loaded, the disk device comprising:
    a body structure;
    a disk tray supported by the body structure so as to be movable between a closed position and an open position, the disk tray including
        a base,
        a disk loading region which is adapted to receive the disk and is formed on the base, and
        an upward facing projection formed on the base on a closed position side of the disk loading region; and
    an upper case supported by the body structure and positioned above the disk loading region of the disk tray when the disk tray is at the closed position, the upper case including
        an upper ceiling portion,
        a downward facing projection formed on the upper ceiling portion so as to project downward with the downward facing projection having a side face that prevents the disk from sliding in a direction toward the closed position beyond the side face, and
        an inclined surface formed between the upper ceiling portion and the side face of the downward facing projection so as to be inclined downward in the direction toward the closed position,
    the upward facing projection being positioned on the closed position side relative to the downward facing projection when the disk tray is at the closed position.

2. The disk device of claim 1, wherein
    the upward facing projection is formed on the base so as not to reach the downward facing projection when the disk tray moves from the closed position to the open position.

3. A disk in which a disk is adapted to be loaded, the disk device comprising:
    a body structure;
    a disk tray supported by the body structure so as to be movable between a closed position and an open position, the disk tray including
        a base, a disk loading region which is adapted to receive the disk and is formed on the base, and
an upward facing projection formed on the base on a closed position side of the disk loading region; and an upper case supported by the body structure and positioned above the disk loading region of the disk tray when the disk tray is at the closed position, the upper case including
an upper ceiling portion,
a downward facing projection formed on the upper ceiling portion so as to project downward, and
an inclined surface formed between the upper ceiling portion and the downward facing projection so as to be inclined downward in a direction toward the closed position, the upward facing projection being positioned on the closed position side relative to the downward facing projection when the disk tray is at the closed position, the downward facing projection projecting downward from a bottom end portion of the inclined surface, a distance by which the downward facing projection extends downward beyond the bottom end portion of the inclined surface being designed to be smaller than a thickness of a peripheral edge of the disk, and a vertical distance between a bottom end of the downward facing projection and an upper end of the upward facing projection being smaller than a width of the peripheral edge of the disk that is exposed beneath the bottom end of the downward facing projection when the downward facing projection engages the disk.

4. The disk device of claim 1, further comprising:
a turntable arranged in the body structure below the disk loading region of the disk tray when the disk tray is at the closed position, the turntable being adapted to chuck the disk; and
a clamp disposed above the turntable, the clamp being adapted to chuck the disk together with the turntable, the clamp being supported by the upper ceiling portion of the upper case.

5. A disk device in which a disk is adapted to be loaded, the disk device comprising:
a body structure;
a disk tray supported by the body structure so as to be movable between a closed position and an open position, the disk tray including
a base,
a disk loading region which is adapted to receive the disk and is formed on the base, and
an upward facing projection formed on the base on a closed position side of the disk loading region;

a turntable arranged in the body structure below the disk loading region of the disk tray when the disk tray is at the closed position, the turntable being adapted to chuck the disk;

a clamp disposed above the turntable, the clamp being adapted to chuck the disk together with the turntable; and an upper case supported by the body structure and positioned above the disk loading region of the disk tray when the disk tray is at the closed position, the upper case including
a clamp support portion which supports the clamp,
a downward facing projection formed on the clamp support portion so as to project downward, and
an inclined surface formed between the clamp support portion and the downward facing projection so as to be inclined downward in a direction toward the closed position, the upward facing projection being positioned on the closed position side relative to the downward facing projection when the disk tray is at the closed position, the upward facing projection being formed on the base so as not to reach the downward facing projection when the disk tray moves from the closed position to the open position, the downward facing projection projecting downward from a bottom end portion of the inclined surface, a distance by which the downward facing projection extends downward beyond the bottom end portion of the inclined surface being designed to be smaller than a thickness of a peripheral edge of the disk, and a vertical distance between a bottom end of the downward facing projection and an upper end of the upward facing projection being smaller than a width of the peripheral edge of the disk that is exposed beneath the bottom end of the downward facing projection when the downward facing projection engages the disk.

* * * * *